Nov. 12, 1968 D. MURRAY 3,411,095

LOGIC CIRCUITRY FOR EXTENDING SIGNALS GENERATED BY THE READING OF PUNCHED HOLES IN A CARD

Filed Oct. 26, 1964 3 Sheets-Sheet 1

INVENTOR.
DAVID MURRAY

BY Warren F. B. Lindsley

Nov. 12, 1968 D. MURRAY 3,411,095

LOGIC CIRCUITRY FOR EXTENDING SIGNALS GENERATED BY THE READING OF PUNCHED HOLES IN A CARD

Filed Oct. 26, 1964

3 Sheets-Sheet 3

3,411,095

LOGIC CIRCUITRY FOR EXTENDING SIGNALS GENERATED BY THE READING OF PUNCHED HOLES IN A CARD

David Murray, Phoenix, Ariz., assignor to General Electric Company, a corporation of New York Filed Oct. 26, 1964, Ser. No. 406,451
11 Claims. (Cl. 328—92)

ABSTRACT OF THE DISCLOSURE

Logic circuitry for extending signals generated by the reading of punched holes in the cards beyond the time the holes are being sensed in order to provide sufficient time for simultaneity to occur between the signals generated representative of the information being read and timing pulses.

This invention relates to systems for reading coded information and more particularly to means employing logic circuits for controlling signals developed from a reading of punched holes in an information bearing medium.

In high speed data processing systems, information processed by the system is supplied from an external source. This external source may furnish information to the data processing system from suitable information bearing mediums such as punched cards. Such cards usually have holes selectively punched at any one of the intersections of a matrix of eighty vertical columns and twelve horizontal rows. These holes are usually rectangular in shape and may be closely spaced leaving between them a thin web of card material.

Card readers are used for reading information punched into the cards and for converting the presence or absence of a hole into an electrical signal representing a binary 1 or 0. Stacks of cards placed in a hopper of the card reader are rapidly moved one at a time from the hopper, past a sensing station where they are read, and then deposited in another stack. High speed movement of the cards over each other as they move into and out of the stacks may damage or tear out the narrow webs of material extending between adjacent punched holes. Since the holes and webs of material are used in creating separate and distinct signals for each punched hole, their damage or destruction causes the card reader to malfunction. For example, if a web between two adjacent punched holes is torn, the card reader will erroneously produce only one signal for both punched holes.

In order that information read from a card may be synchronously transferred to a data processor, some system must be provided for generating a timing pulse for each column position of the card scanned. One such system employs a sensor which starts the generation of timing pulses when the leading edge of the card reaches a given position in its travel through the card reader. Such a system insures that the first timing pulse occurs at the time the first column of the card is in position to be read. Other timing pulses follow the first pulse at regular intervals so that a perfectly aligned card would have a column in position to be read each time a timing pulse occurs. Each timing pulse causes an information signal existing during the timing pulse to be transferred to the data processor. Card expansion or contraction due to moisture and slippage between the card and the card moving mechanism may cause timing pulses to occur at times when holes in later columns of the card are not at the sensing station. Therefore, a need exists for logic circuitry which will periodically transfer signals representative of the information being read by the card reader even though coincidence does not occur between the reading of a hole and a timing pulse.

Accordingly, it is an object of this invention to provide an improved system for reading punched holes in an information bearing medium.

Another object of this invention is to provide a novel system for reading punch cards having damaged or torn webs between the holes.

A further object of this invention is to provide a novel system for extending the duration of a signal, representative of the information being read, beyond the time the punched hole representing the information exists at a sensing station.

Other objects and advantages of the present invention will be apparent from the following specification taken in connection with the accompanying drawings.

Briefly, in accordance with one embodiment of the present invention, a new and improved system is provided for accurately reading information from punched cards. These cards will be correctly read even though they have torn or damaged webs between the holes. The logic circuitry disclosed extends the signals generated by the reading of punched holes in the cards beyond the time the holes are being sensed in order to provide sufficient time for simultaneity to occur between the signals generated representative of the information being read and the timing pulses. These functions are achieved by providing a novel combination of timing and signal storage means. The signals, representative of the information being read during the time holes are present at a sensing station in a card reader, are stored in a storage means. These signals are retained in the storage means for a time substantially equal to the time the punched holes and the following web of a particular column appear before the sensing station, regardless of whether the web of that column is physically there or not. The transfer of signals out of the storage means occurs at any time during this storage period.

The present invention may be more readily described by reference to the accompanying drawings in which.

The present invention relates to a system for reading coded information from punched cards and since it is believed to be unnecessary to describe the well-known details of these systems in order to completely describe the invention, block diagrams will be used where possible. However, even though known details will be illustrated, the basic description of the entire system will be presented to enable one skilled in the art to understand the environment in which the present invention is placed.

Figure 1:
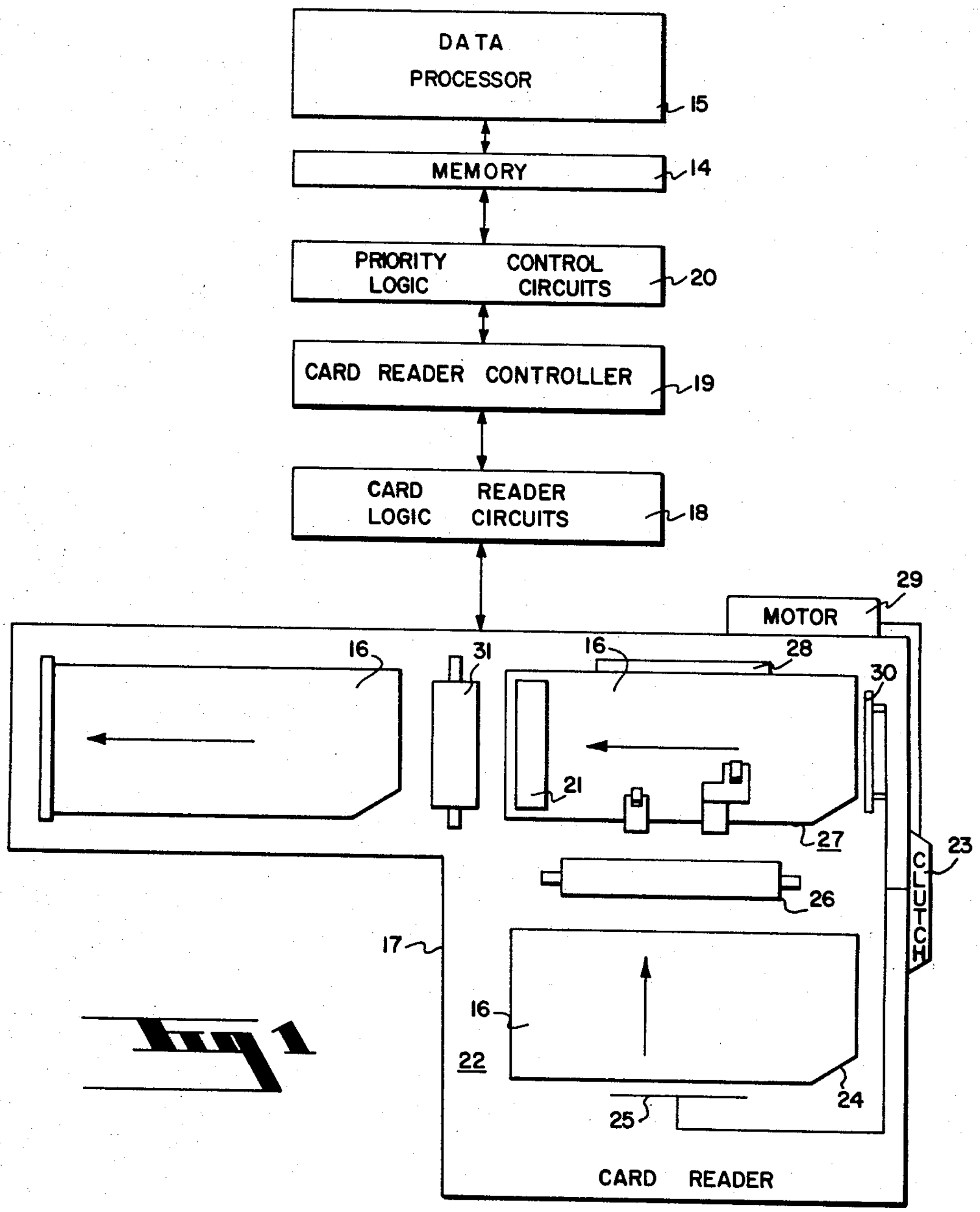
FIG. 1 is a block diagram of an information processing system embodying the present invention.

Referring more particularly to the drawings by characters of reference, FIG. 1 discloses an information processing system wherein a memory 14 associated with a data processor 15 receives signals representative of information read from a plurality of punched cards 16 by a serial card reader 17. The signals pass through a card reader logic circuit 18 and a card reader controller 19 and are placed in memory 14 under the control of priority control logic 20.

Card reader 17 may be one of the known types and is illustrated schematically in FIG. 1 to show the relative positions of the various components of such a device. Cards 16 are moved over a sensing or reading station 21. Reading station 21 may comprise, for example, 12 photocells and 12 lamps (not shown). The lamps may be mounted above the photocells which are embedded in a block and masked by a plate having only a narrow slot above each photocell. The lamps, the slots in the mask and the centers of the photocells are vertically aligned.

As shown in FIG. 1, a card hopper 22 is arranged to hold a stack of cards to be read. A solenoid (not shown) is momentarily energized to selectively engage a single revolution clutch 23 for one complete revolution of operation, in response to which a feed table 24 having a picker knife edge 25 pushes the bottom card of the stack to a driven roller 26. Roller 26 transfers the card onto a sensing platform 27 against a guide rail 28. A motor 29 drives the usual gear trains, linkages and pulleys (not shown) needed for moving the various parts of the card reader structure.

When clutch 23 is actuated for a single revolution, a card is caused to be fed from hopper 22 onto the sensing platform 27. A cam (not shown) causes a feeding arm 30 to advance the card on the sensing platform to the reading station 21. As the feed arm 30 advances the card to the reading station 21, a suitable leading edge detector of a photoelectric timing generator is utilized for synchronizing the reading and transferring of information such as, for example, data from the card to the data processor. Feed arm 30 advances the card so that feed roller 31 engages the card and moves the card over the reading station.

Figure 2:
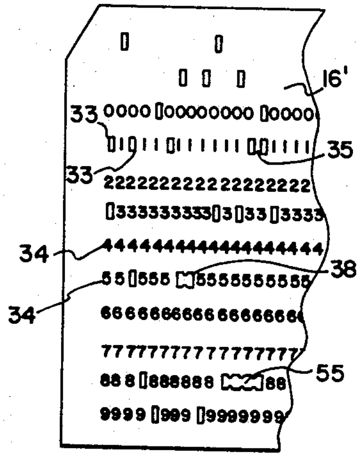
FIG. 2 is a partial view of a standard eighty column, twelve row punch card showing information punched on the card and diagrammatically illustrating torn webs between some of the punched holes.

FIGURE 2 illustrates a partial view of a standard eighty column, twelve row punch card 16' showing the recorded punched information, represented by rectangular impressions, at the intersections of the various rows and columns. The punched holes or rectangular impressions 33 represent binary 1's and the blanks 34 (i.e., no punch impressions) at the intersections of the various rows and columns represent binary 0's. The twelve rows are divided into two areas, namely a zone area and a numeric area. The zone area consists of rows 0, 11, and 12 and the numeric area consists of rows 0 through 9. Row 0, shown immediately below the unnumbered rows 11 and 12, is common to both zone and numeric areas. Information in the alphanumeric format represents the 26 letters of the alphabet, the numerals 0 through 9, and 28 special characters, punctuation marks and blank spaces. Numerals are represented by a single punch per column in rows 0 through 9. Alphabetics are represented by two punches per colunm, a zero punch and a numeric punch. Special characters consist of either 2 or 3 punches per column. Since each column of the card shown in FIG. 2 contains a single character, each card can hold eighty characters.

Figure 3:
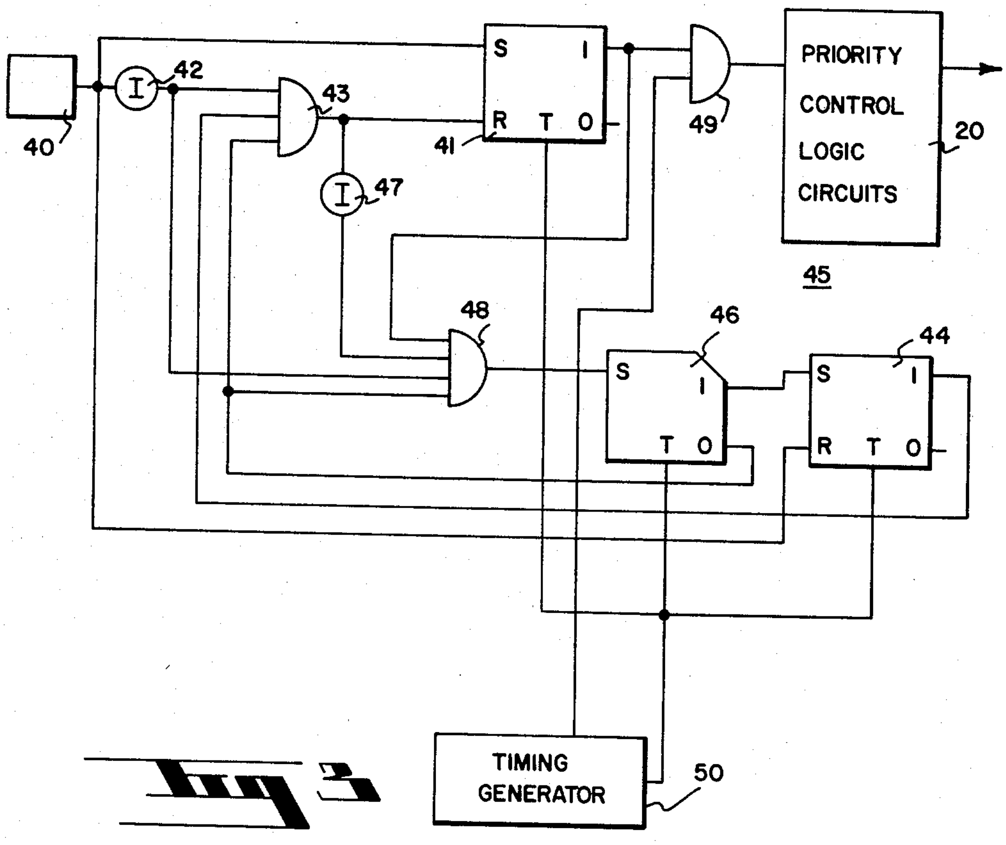
FIG. 3 is a block diagram of the logic circuitry of the present invention.

FIGURE 3 illustrates in block diagram the logic circuitry provided for implementing the torn web and information extension features of the present invention. Although a card reader may have twelve identical sensing stations for reading the cards sequentially column by column, only one sensing station is shown in FIG. 3 for purposes of simplicity. Similarly, the logic circuitry disclosed in FIG. 3 is provided for only one sensing station and similar circuitry must be employed for any other sensing station used.

The reading or sensing station 40, shown in FIG. 3, is provided for reading the information punched in a given row of card 16' as it is moved column by column past the sensing station. Signals representative of the information read by station 40 are transferred to and stored in a suitable buffering means such as a flip-flop 41. As used herein, buffering is intended to mean the ability of a facility such as a storage register or flip-flop to provide temporary storage of the binary digit (bit) being read by the card reader before transferring it, for example, to the data processor. The flip-flop or bistable multivibrator described herein is a circuit adapted to operate in either one of two stable states and to transfer from the state in which it is operating to the other stable state upon application of a trigger signal thereto. In one state of operation, the flip-flop represents the binary 1 (1-state) and in the other state, the binary 0 (0-state).

The two leads entering the left-hand side of the flip-flop symbols shown in FIG. 3 provide the input signals. The upper input lead, the set input lead, provides the set signal and the lower input lead, the reset input lead, provides the reset input signal. When the set input signal goes positive, the flip-flop is enabled and will be transferred to its 1-state upon the simultaneous application of a timing or trigger pulse to its input terminal T, if it is not already in the 1-state. When the reset input signal goes positive, the flip-flop is enabled and will be transferred to its 0-state upon the simultaneous application of a timing or trigger pulse to its input terminal T, if it is not already in the 0-state. The two leads leaving the right-hand side of the flip-flop symbols deliver the two output signals. The upper output lead, the 1 output lead, delivers the 1 output signal of the flip-flop and the lower output lead, the 0 output lead, delivers the 0 output signal.

Positive signals transferred to flip-flop 41 set the flip-flop to its 1-state upon the simultaneous occurrence of a timing pulse at its input terminal. The signals representative of the information read by station 40 not only set flip-flop 41 but also transfer through an inverter 42 to an input terminal of an AND-gate 43, and to a reset terminal of a flip-flop 44 forming a part of a signal delay means 45.

The inverters disclosed provide the logical operation of inversion for an input signal applied thereto. The inverter provides a positive output signal representing a binary 1 when the input signal applied thereto is negative, representing a binary 0. Conversely, the inverter provides an output signal representing a binary 0 when the input signal represents a binary 1. The symbols in FIG. 3 identified by the reference numerals 42 and 47 represent such inverters.

The AND-gates disclosed in FIG. 3 provide the logical operation of conjunction for binary 1 signals applied thereto. In the system disclosed, a binary 1 is represented by a positive signal, the AND-gate provides a positive output signal representing a binary 1 when, and only when, all of the input signals applied thereto are positive and represent binary 1's. The symbol identified by reference numerals 43, 48 and 49 in FIG. 3 represent AND-gates having 3, 4 and 2 input terminals, respectively. Such AND-gates deliver a binary 1 output signal only when each of the input signals applied thereto represent a binary 1.

A suitable timing generator 50 is utilized to supply timing pulses to set or reset the bistable multivibrators or flip-flops 41 and 44 and a monostable multivibrator or flip-flop 46 and to provide a series of timing pulses for transferring signals representing the information stored in flip-flop 41 through AND-gate 49, forming a part of card reader controller 19, to the priority control logic circuits 20. Conditions for conjunction in AND-gate 49 are satisfied upon the simultaneous application of the output signal of the 1 terminal of flip-flop 41 when it is in its 1-state and a timing pulse received from timing generator 50. The output signal from AND-gate 49 is transferred to the priority control logic circuits 20 for causing a representative signal to be transferred to memory 14 associated with the data processor 15 shown in FIG. 1.

Flip-flop 41 remains in its set state until reset by an output signal from AND-gate 43. AND-gate 43 provides an output signal for resetting flip-flop 41 when the conditions for conjunction in it have been satisfied. This occurs when all input signals to the input terminals of AND-gate 43 are positive.

In accordance with the invention claimed, flip-flop 41 remains in its set state throughout the reading of the punched hole and the following web in the particular column of the card being read by the sensing station. The web is identified as that portion of the card, such as portion 35, appearing between contiguous holes in a given row. This retention of the information signal beyond the hole being read is accomplished by providing a time delay substantially equal to the time necessary for the web of that column to pass the sensing station before the signals representing the information read are removed from the storage flip-flop 41. A monostable multivibrator 46 forming a part of the delay means 45 is provided for accomplishing this delay feature.

Monostable multivibrator 46 is a circuit similar to the flip-flop circuit of the bistable multivibrator 44 differing only in that it operates in one stable state rather than two. It transfers from its reset state in which it is normally operating to its set state upon application of a trigger signal thereto. In its set state, the monostable multivibrator represents the binary 1 (1-state) and in the reset state, the binary 0 (0-state). The lead entering the left-hand side of the monostable multivibrator symbol shown in FIG. 3 provides the set input signal. When the set input signal goes positive, the monostable multivibrator is transferred to its 1-state upon the simultaneous application of a timing or trigger pulse to its T input terminal. It will stay in this set state for a predetermined period of time depending on the time delay rating of the multivibrator and will then automatically return to its stable state (i.e., its reset state). Because the monostable multivibrator returns by itself to its reset state, no reset input is required. The period of time the multivibrator remains in its set state can be controlled by the selection of electronic components used to build the monostable multivibrator circuit. In the circuit disclosed, the duration of the 1-output signal of multivibrator 46 is approximately equal to the web-time of the cards being read.

As shown in FIG. 3, the 1-output terminal of the monostable multivibrator 46 is connected to the set input terminal of flip-flop 44. Since the reset terminal of flip-flop 44 is connected to sensing station 40, flip-flop 44 is reset to its 0 state upon the reading of a punched hole in card 16' and the simultaneous occurrence of a pulse from timing generator 50, and it remains in the 0-state until set to its 1-state by an output signal from the 1-output terminal of monostable multivibrator 46 and the simultaneous occurrence of a timing pulse from timing generator 50. The set input terminal of monostable multivibrator 46 is connected to the output terminal of AND-gate 48.

Since monostable multivibrator 46 is normally in its reset stable state, the lower input terminals of AND-gates 43 and 48, connected to the 0-output terminal of multivibrator 46, are at positive potentials during the reading of a punched hole. The middle input terminal of AND-gate 43 connected to the 1-output terminal of flip-flop 44 is relatively negative with respect to the positive potential of the lower input terminal of AND-gate 43 since flip-flop 44 is reset at this point in the operation of the circuitry disclosed. Conditions for conjunction in AND-gate 43 do not exist. Thus, the output terminal of AND-gate 43 is relatively negative with respect to its output condition under conditions of conjunction. This negative signal is inverted by inverter 47 and applied as a positive signal to the second input terminal of AND-gate 48. A positive signal from the 1-output terminal of flip-flop 41, representing its 1-state, is applied to the upper input terminal of AND-gate 48.

When the web following the hole in a given column is being read, the resulting relatively negative signal, as compared to the relatively positive signal obtained by a reading of a hole, is inverted by inverter 42 and is applied as a positive signal to AND-gate 43. This inverted signal is also applied to AND-gate 48. Since the conditions for conjunction in AND-gate 48 are now satisfied, an output signal from AND-gate 48 is now applied to the set input terminal of monostable multivibrator 46, driving it to its unstable state upon the occurrence of a timing pulse at its input terminal T.

Monostable multivibrator 46 remains in this unstable set state for a period long enough for the web in question to pass by the sensing station. The setting of multivibrator 46 causes the setting of flip-flop 44 to its 1-state at the occurrence of the timing pulse following the setting of the monostable multivibrator 46. At the end of the predetermined time delay, multivibrator 46 resets automatically, thereby creating a condition for conjunction in AND-gate 43, causing an output signal from AND-gate 43 to be applied to the reset input terminal of flip-flop 41. At the next timing pulse of generator 50, flip-flop 41 will be reset. The resting of flip-flop 41 disables AND-gate 48.

Upon reading the next punched hole in card 16', flip-flops 41 and 44 will be set and reset as heretofore described.

If the web following a given hole being read in a card in the column in question is damaged, torn or missing, AND-gate 48 will not be placed in condition for conjunction since the inverted signal applied to its third input terminal will remain negative. Monostable multivibrator 46 will not be set. Flip-flop 41 remains set. Therefore, each time an enabling timing pulse is applied to AND-gate 49, an output signal from AND-gate 49 will be transferred to the priority control logic circuits 20. This will occur at periodic intervals even though the webs are missing between a plurality of contiguous holes, such as the situations shown in FIG. 2 at points 38 and 55. As soon as a web is read by the sensing station, monostable multivibrator 46 will be set and the data storage flip-flop 41 reset as heretofore explained.

In accordance with the invention disclosed, flip-flop 41 remains set through the hole and web time of a particular column being read and the signal stored therein may be transferred to memory 14 at any time during the movement of that column past the sensing station, regardless of whether the punched hole has moved past the reading station.

Figure 4:
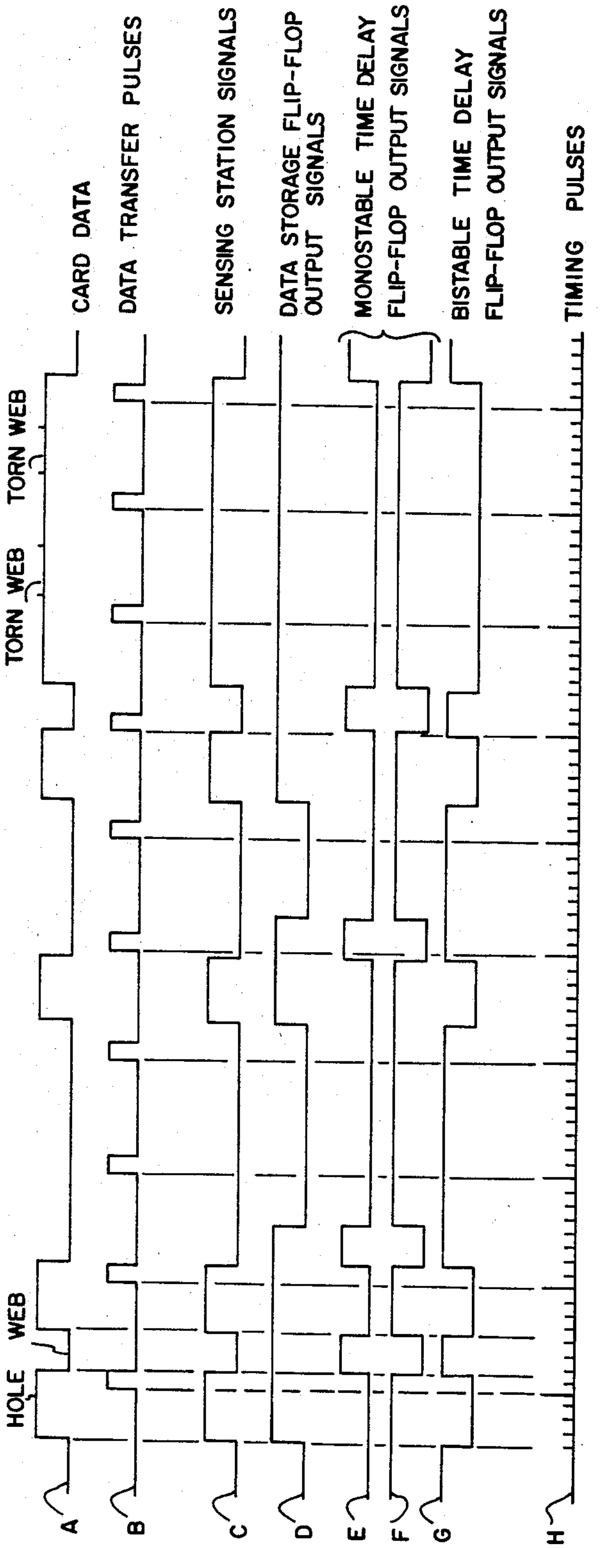
FIG. 4 is a timing chart of the waveforms useful in explaining the operation of the present invention.

The operation of the torn web and time extension features of this invention may be more clearly seen by reference to the timing chart shown in FIG. 4.

Waveform A illustrates diagrammatically card data read by sensing station 40. This waveform is not illustrative of the information shown in card 16' and is shown for illustrative purposes only. At the right-hand end of this waveform, a hypothetical torn web condition is illustrated.

Waveform B illustrates the transfer or timing pulses provided by the timing generator 50 for synchronizing the transfer of information or card data shown in waveform A to the priority control logic circuits of the data processing system shown.

Waveform C illustrates graphically the output signals of the sensing station 40 upon reading the card data illustrated in waveform A.

Waveform D illustrates graphically the output signals of the 1-output terminal of flip-flop 41.

Waveforms E and F illustrate graphically the output signals of the 1 and 0 output terminals, respectively, of the monostable multivibrator 46.

Waveform G illustrates graphically the output signals of flip-flop 44.

Waveform H illustrates the timing pulses provided by the timing generator 50 for triggering flip-flops 41, 44 and monostable multivibrator 46. For purposes of illustration, each timing pulse shown in waveform H may be spaced four microseconds apart with one synchronizing pulse of waveform B occurring each eighty pulses of waveform H.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

What is claimed is:

1. In a system for reading a medium having coded information punched therein and employing means for sensing the presence and absence of holes in said medium and for delivering a first signal when said sensing means reads a hole and a second signal when said sensing means reads the absence of a hole, the combination comprising: a storage means coupled to receive said first signal for assuming a first state, a signal delay means coupled to receive said second signal for delivering a third signal after a predetermined time, and means coupled to receive said second and third signals and effective upon the coincidence of said second and third signals for controlling said storage means to cause it to assume a second state, said storage means delivering output signals corresponding to its storage condition.

2. In a system for reading a medium having coded information punched therein and employing means for sensing the presence and absence of holes in said medium and for delivering a first signal when said sensing means reads a hole and a second signal when said sensing means reads the absence of a hole, the combination comprising: a storage means coupled to receive said first signal for assuming a first state, a monostable multivibrator coupled to receive said second signal for delivering a third signal after a predetermined time delay, and gating means coupled to receive said second and third signals and effective upon the coincidence of said second and third signals for controlling said storage means to cause it to assume a second state, said storage means delivering output signals corresponding to its storage condition.

3. In a system for reading a medium having coded information punched therein and employing means for sensing the presence and absence of holes in said medium and for delivering a first signal when said sensing means reads a hole and a second signal when said sensing means reads the absence of a hole, the combination comprising: a storage means having two stable states coupled to receive said first signal for assuming a first state, a signal delay means coupled to receive said second signal for delivering a third signal after a predetermined time, and gating means coupled to receive said second and third signals and effective upon the coincidence of said second and third signals for causing said storage means to assume a second state, said storage means generating output signals corresponding to its state.

4. In a system for reading a medium having coded information punched therein and employing means for sensing the presence and absence of holes in said medium and for delivering a first signal when said sensing means reads a hole and a second signal when said sensing means reads the absence of a hole, the combination comprising: a storage means having two stable states coupled to receive said first signal for assuming a first state, a signal delay means coupled to receive said second signal for delivering a third signal after a predetermined time, and gating means coupled to receive said second and third signals and effective upon the coincidence of said second and third signals for generating a fourth signal, said storage means being coupled to receive said fourth signal for assuming a second state, said storage means delivering output signals corresponding to its state.

5. In a system for reading a medium having coded information punched therein and employing means for sensing the presence and absence of holes in said medium and for delivering a first signal when said sensing means reads a hole and a second signal when said sensing means reads the absence of a hole, the combination comprising: a storage means having two stable states coupled to receive said first signal for assuming a first state, a signal delay means coupled to receive said second signal for delivering a third signal after a predetermined time, a first gating means coupled to receive said second and third signals and effective upon the coincidence of said second and third signals for causing said storage means to assume a second state, said storage means delivering output signals corresponding to its storage condition, and a second gating means coupled to receive said output signals and arranged to deliver signals at predetermined intervals of time upon the receipt of first output signals corresponding to the first state of said storage means.

6. In a system for reading a medium having coded information punched therein and employing means for sensing the presence and absence of holes in said medium and for delivering a first signal when said sensing means reads a hole and a second signal when said sensing means reads the absence of a hole, the combination comprising: a timing means for generating a series of timing pulses, a storage means having two stable states coupled to receive said first signal for assuming a first state, a signal delay means coupled to receive said second signal for delivering a third signal after a predetermined time, a first gating means coupled to receive said second and third signals and effective upon the coincidence of said second and third signals for causing said storage means to assume a second state, said storage means delivering first output signals corresponding to its storage condition, and a second gating means coupled to receive said first output signals and said timing pulses and effective upon coincidence of said first output signals corresponding to said first state and a timing pulse for delivering second output signals.

7. In a system for reading a medium having coded information punched therein and employing means for sensing the presence and absence of holes in said medium and for delivering a first signal when said sensing means reads a hole and a second signal when said sensing means reads the absence of a hole, the combination comprising: a storage means having two stable states coupled to receive said first signal for assuming a first state, a signal delay means, said signal delay means comprising a monostable multivibrator and a bistable multivibrator, said monostable multivibrator being coupled to receive said second signal for delivering a third signal after a predetermined time, said bistable multivibrator coupled to receive said third signal for delivering a fourth signal after a second predetermined time delay, and a gating means coupled to receive said second and fourth signals and effective upon the coincidence of said second and fourth signals for causing the storage means to assume a second state, said storage means delivering output signals corresponding to its storage condition.

8. In a system for reading a medium having coded information punched therein and employing means for sensing the presence and absence of holes in said medium and for delivering a first signal when said sensing means reads a hole and a second signal when said sensing means reads the absence of a hole, the combination comprising: a storage means having two stable states coupled to receive said first signal for assuming a first state, said storage means delivering a third signal while in said first state, a signal delay means normally operative in one state and delivering a fourth signal, first gating means coupled to receive said second, third and fourth signals and effective upon coincidence of said second, third and fourth signals for delivering a fifth signal, said delay means coupled to receive said fifth signal and for delivering a sixth signal after a predetermined time, and second gating means coupled to receive said second and sixth signals and effective upon the coincidence of said second and sixth signals for causing said storage means to assume a second state, said storage means delivering output signals corresponding to its storage condition.

9. In a system for reading a medium having coded information punched therein and employing means for sensing the presence and absence of holes in said medium and for delivering a first signal when said sensing means reads a hole and a second signal when said sensing means reads the absence of a hole, the combination comprising: a storage means having two stable states coupled to receive said first signal for assuming a first state, said storage means delivering a third signal while in said first state, a signal delay means normally operative in one state and delivering a fourth signal, first gating means coupled to receive said second, third and fourth signals and effective upon concurrence of said second, third and fourth signals for delivering a fifth signal, said delay means coupled to receive said fifth signal and for delivering a sixth signal after a predetermined time, a second gating means coupled to receive said second and sixth signals and effective upon the coincidence of said second and sixth signals for causing said storage means to assume a second state, said storage means delivering first output signals corresponding to its storage condition, a timing means for generating a series of timing pulses; and a third gating means coupled to receive said first output signals and said timing pulses and effective upon coincidence of said first output signals corresponding to said first state and a timing pulse for delivering second output signals.

10. In a system for reading punched cards having holes at a plurality of predetermined locations thereon, wherein sensing means are provided for sensing the presence of holes in said card during movement of the card past said sensing means and for delivering a first signal, said first signal having a first value when said sensing means is opposite a hole and a second value when said sensing means is not opposite a hole, and wherein a timing means generates a series of timing pulses in substantially timed relationship to the relative position of the card and the sensing means; the combination comprising: a storage means having two stable states coupled to receive said first signal and responsive to said first value for assuming a first state; a signal delay means normally operative in one state coupled to receive said timing pulses and said first signal and responsive to the combination of a timing pulse and said second value of said first signal for assuming a second state for a predetermined interval of time, said delay means delivering a second signal having values representing the states thereof; and gating means coupled to receive said first and second signals and effective upon the coincidence of said first signal at said second value and said second signal representing said second state of said delay means for controlling storage means to cause said storage means to assume a second state, said storage means delivering a third signal corresponding to the states of said storage means.

11. In a system for reading punched cards having holes at a plurality of predetermined locations thereon, wherein sensing means are provided for sensing the presence of holes in said card during movement of the card past said sensing means and for delivering a first signal, said first signal having a first value when said sensing means is opposite a hole and a second value when said sensing means is not opposite a hole, and wherein a timing means generates a series of timing pulses in substantially timed relationship to the relative position of the card and the sensing means; the combination comprising: a storage means having two stable states coupled to receive said first signal and responsive to said first value for assuming a first state, a signal delay means normally operative in one state coupled to receive said timing pulses and said first signal and responsive to the combination of a timing pulse and said second value of said first signal for assuming a second state for a predetermined interval of time, said delay means delivering a second signal having values representing the states thereof; a first gating means coupled to receive said first and second signals and effective upon the coincidence of said first signal at said second value and said second signal representing said first state of this delay means to transfer said storage means to its second state; said storage means delivering signals corresponding to the state of its storage condition; and a second gating means coupled to said storage means and said timing means and jointly responsive to said last mentioned signals representing the first state of said storage means and a pulse from the timing means for producing an output signal.

References Cited

UNITED STATES PATENTS

| | | | |
|---|---|---|---|
| 3,226,577 | 12/1965 | Azuma et al. | 328—110 X |
| 3,314,013 | 4/1967 | Dirac et al. | 328—92 X |

ARTHUR GAUSS, *Primary Examiner.*

R. H. PLOTKIN, *Assistant Examiner.*